June 9, 1925.  1,540,976
F. E. ARNDT
FRONT WHEEL ASSEMBLY FOR GRADERS
Filed Aug. 16, 1924   2 Sheets-Sheet 1
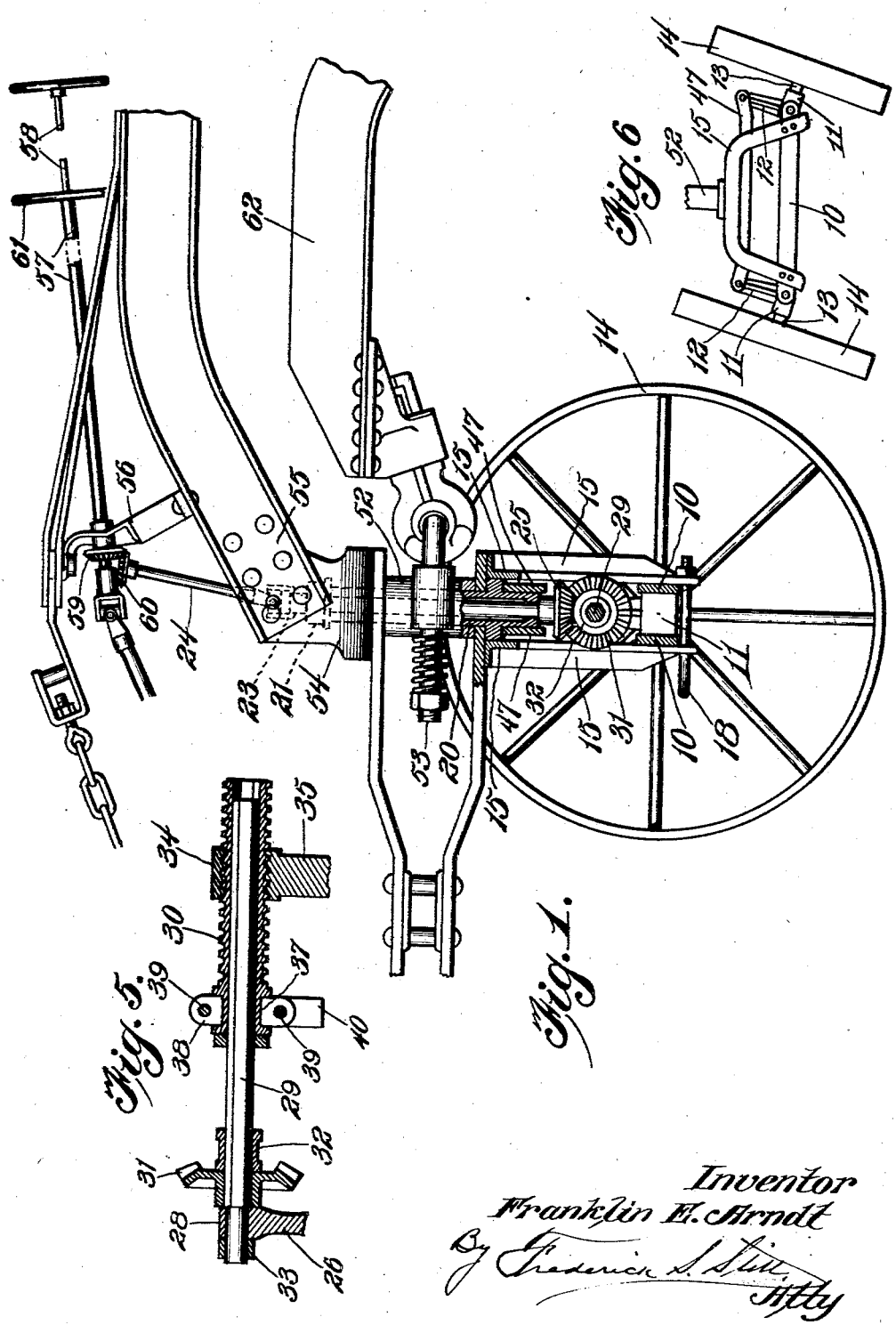
Inventor
Franklin E. Arndt

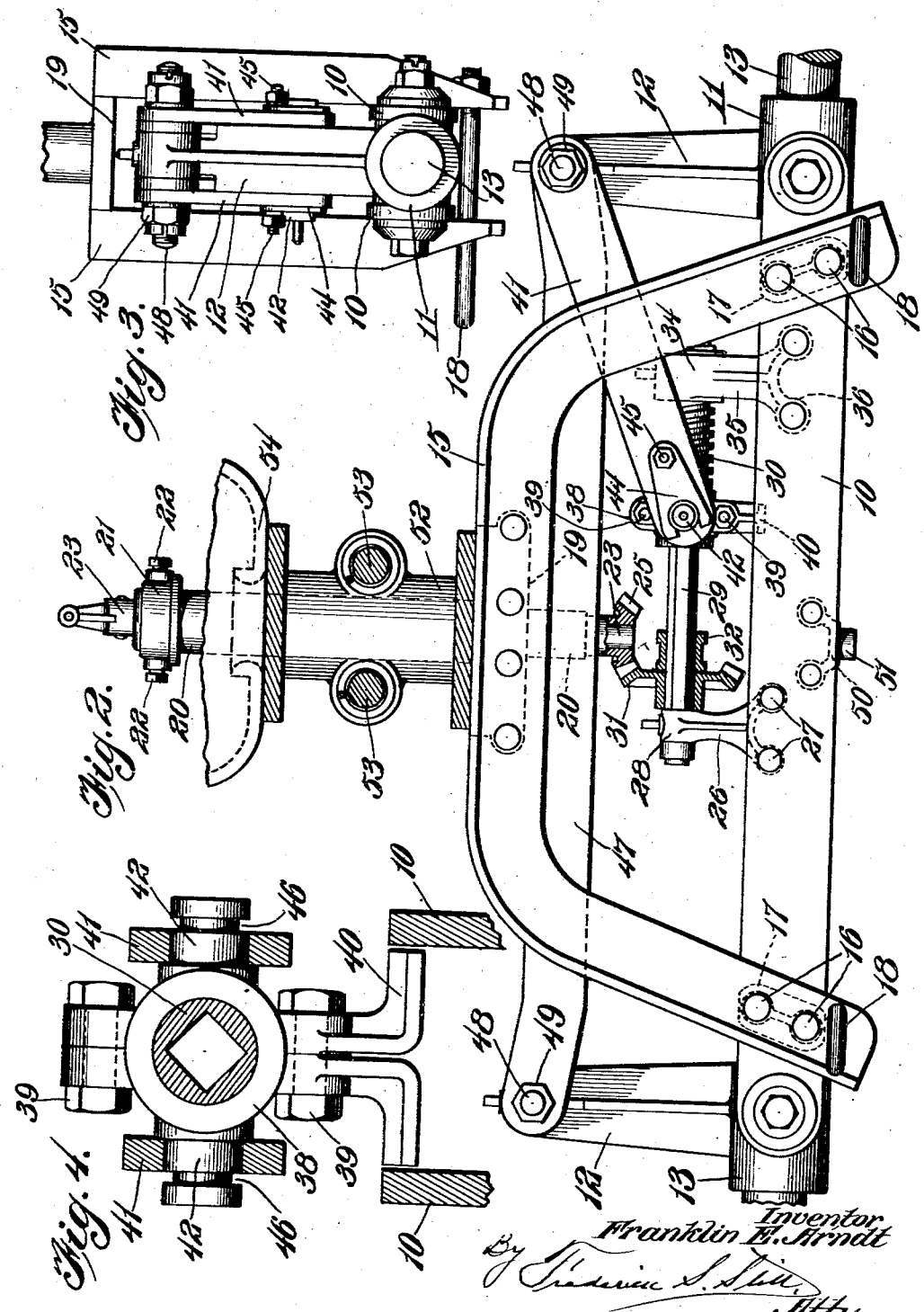

Patented June 9, 1925.

1,540,976

UNITED STATES PATENT OFFICE.

FRANKLIN E. ARNDT, OF GALION, OHIO, ASSIGNOR TO THE GALION IRON WORKS & MFG. CO., OF GALION, OHIO, A CORPORATION OF OHIO.

FRONT-WHEEL ASSEMBLY FOR GRADERS.

Application filed August 16, 1924. Serial No. 732,540.

*To all whom it may concern:*

Be it known that I, FRANKLIN E. ARNDT, a citizen of the United States, residing at Galion, in the county of Crawford and State of Ohio, have invented certain new and useful Improvements in Front-Wheel Assemblies for Graders, of which the following is a specification.

This invention relates to graders and scrapers, and particularly to that type of grader or scraper wherein what are known as leaning wheels are used, the general object of the invention being to provide a leaning wheel grader or scraper wherein the angle which may be given to the wheels, or the lateral tilt of the wheels in other words, may be adjusted so as to permit the grader to be leaned against the side load of earth, thus counteracting any tendency to side slip or skid and eliminating side draft.

A further object of the invention is to provide a construction for this purpose in which the forward wheels are mounted upon adjustable spindles, and provide very simple power operated means whereby these spindles may be adjusted to cause the wheels to be brought into a vertical position or to be canted any required amount.

A still further object is to provide means for operating these wheels from the operator's station and to improve the details of construction and arrangement of parts so as to secure a very rigid structure which at the same time will provide for all necessary adjustments of the scraper and of the blades in order to accomplish the work for which scrapers or graders of this character are designed.

Another object is to provide a structure of this character with powerful but easily operated means for tilting or leaning the wheels and holding them rigidly in their adjusted positions.

Other objects will appear in the course of the following description;

My invention is illustrated in the accompanying drawings, wherein:—

Figure 1 is a fragmentary side elevation of the forward end of a leaning wheel grader, the axle and allied parts being in section;

Figure 2 is an elevation partly in section of the forward axle and allied parts;

Figure 3 is an end elevation of parts shown in Figure 2;

Figure 4 is a vertical section through the bars 10, the links 41 and worm 30 showing the yoke 38 in elevation;

Figure 5 is an elevation of shaft 29 with the worm shown and fixed nut in section;

Figure 6 is a diagrammatic elevation showing the front axle with wheels canted.

In these drawings, I have illustrated only the forward portion of a grader constructed in accordance with my invention, and it will be understood that the rear end of the grader is also equipped with tiltable wheels and, as a matter of fact, with wheels which are not only tiltable but extensible, as illustrated in my pending application Serial #733,406 filed on the 21st day of August, 1924. The grader is also equipped with a forwardly extending tongue which is operated by a tongue swinging mechanism mounted upon the grader and extending rearward to the operator's station and with a blade or mold board mounted upon a circle in the usual manner so that the mold board may be shifted at the will of the operator at the operator's station into any desired inclination to the line of draft, and further so that the mold board may be shifted laterally to a greater or less extent. Inasmuch as these features form no part of my present invention, I have not illustrated them but merely state them so that it may be understood to what character of grader this invention is particularly applied.

Referring to the drawings, 10 designates two spaced axle bars, these axle bars being spaced from each other by spacing sleeves, as will be later stated, and at the ends these axle bars carry between them the wheel control knuckles, designated generally 11, and each wheel control knuckle has an upwardly extending arm 12 and a laterally extending stub shaft 13 upon which the wheels 14 are mounted. Riveted, bolted or otherwise attached to the outer faces of the axle bars 10 are the angle iron arches 15 which are riveted to these axle bars by means of the rivets 16 which pass through spacing sleeves 17 disposed between the bars. The lower ends of these arches 15 carry in them eye-bolts 18. Mounted between the upper horizontal portions of the arches 15 is a casting 19 which forms the base of a hollow king pin 20, the upper end of this king pin being formed to receive upon it a cap 21 or king pin collar held in place by set screws 22 which engage with the hollow king pin at its upper end.

Passing through the hollow king pin is a shaft 23, the upper end of which has a universal joint connection with a shaft section 24. Mounted upon the lower end of this shaft 23 is a beveled gear wheel 25. Mounted upon the axle bars adjacent the middle thereof is a bearing bracket 26, the lower end of which extends down between the bars and acts as spacers therefor, there being rivets 27 passing through the base of this bracket 26 and through the axle bars. The upper end of this bearing bracket is formed with a bearing 28, and mounted in this bearing is a preferably hexagonal worm shaft 29, one end of which carries a worm 30 and this worm being mounted in a fixed nut, as will be later described. The shaft 29 fits into a beveled gear wheel 31 which engages with the beveled gear wheel 25. The beveled gear wheel 31 is held in a fixed position between the bearing 28 and a collar 32. The shaft 29, as before remarked, is hexagonal in form and the bore in the wheel 31 is also hexagonal in form so that the shaft has rotative movement with the wheel 31 and in the bearing 28, which supports the shaft. The shaft is also supported by the worm 30, which revolves in a fixed nut and thus constitutes a bearing for the shaft.

The worm, as previously stated, is mounted in a fixed nut 34 which is mounted upon a standard or pedestal 35 having a base 36 which is disposed between the axle bars and constitutes a spacing member therefor and through which rivets pass holding the base of the fixed nut in place. The fixed nut is internally screw-threaded to engage the worm 30, this worm 30 having a centrally extending bore which is hexagonal in cross section to slide upon the shaft 29. One end of this worm is formed with a circumferential groove or recess 37 to receive the worm collar 38 which is formed in two half sections, each section being formed with a supporting pedestal and with a base portion. The two sections are held together by bolts 39, the depending angularly bent base 40 being disposed between and having sliding movement between the axle bars 10. It will be obvious now that as the shaft 29 is rotated in one direction or the other, the worm 30 will operate through the fixed nut 34 and this will shift the worm in one direction or the other and, of course, shift the worm collar 38.

Attached to the upwardly extending arm 12 of one of the knuckles 11 is a link 41, this link being operatively pivoted to the upper end of the arm 12 and at its inner end being operatively pivoted upon trunnions 42, as illustrated in Figure 4. There are two of these links 41 and holding these links in place upon the hubs or trunnions 42 are the locking clips 44 which are mounted upon a bolt 45 and which are formed with approximately semi-circular openings adapted to engage in the recess 46 formed between the head and the body of the trunnion. It will be obvious, therefore, that as the shaft 29 is rotated, the fixed nut will cause a longitudinal movement of the worm, which in turn will carry along with it the collar 38 and, therefore, through the link 41 will move the knuckle 11. The movement of one knuckle 11 is transmitted to the other knuckle by means of a transversely extending link 47, the opposite ends of which are angularly bent and are, of course, pivotally connected to the two knuckles.

As illustrated in Figure 3, there are two links 41 and two links 47 and the upper end of the arm 12. These links and the arm 12 are connected together by a transversely extending bolt 48 having nuts 49 at its ends. Also disposed between the bars 10 is a tongue brace support base 50 from which extends downwardly the tongue brace support 51. As shown in Figure 1, the tubular king pin 20 extends upward within a tubular casting 52, through which passes the U-shaped bolt 53 and the upper end of this casting supports the upwardly and laterally extending member 54 which rests upon the upper flat end of the member 52 and rotates therearound. The arms of this member 54 are riveted or otherwise connected to the longitudinal beams 55 which form the supporting frame of the scraper. Mounted upon this frame is a bracket 56, through which passes an outer tubular shaft 57 and an inner shaft 58, this inner shaft being operatively connected to the tongue adjusting mechanism in a manner which is not necessary to state, inasmuch as this forms no part of my present invention. The outer shaft carries upon it the gear wheel 59 which engages with a gear wheel 60 mounted upon the upper end of the shaft section 24. Thus it will be seen that as this tubular shaft 57 is operated by means of the hand wheel 61, the shaft 29 will be operated to shift the worm 30 longitudinally upon the shaft 29 and thereby tilt the wheels of the machine in one direction or the other.

It will be understood that with a construction of this character, the draft bars 62 to which the scraper is directly connected are operatively connected to the sleeve 54 and that the draft bars have an upward swinging movement and a lateral swinging movement. These draft bars support the usual circle upon which the scraper blade is mounted for adjustment around the circle so that the scraper blade may be disposed at any desired angle to the line of draft. The particular object of providing the scraper with the leaning wheels is to lean the weight toward and balance the weight of the grader against the side load of earth so as to obviate any tendency to side slip and furthermore cause the grader to travel on a straight course without side draft where the horses or tractor are disposed to one side of the path of the grader. Furthermore, this construction permits the mold board of the scraper to be set at a sharp angle even in heavy cuts so that it scours, that is the material slides freely along the mold board with the least possible friction.

By the provision of the leaning wheels, it is possible for the scraper to operate very close to the curbing of a road or street without the wheels scraping against the curbing. Of course, it is understood that where the front wheels are leaning wheels, the rear wheels must be leaning wheels, and while I do not wish to be limited to any particular style of leaning wheel when used in connection with a vehicle having the leaning forward wheels constructed in accordance with this present application, yet preferably the scraper will be equipped with the leaning wheels shown in application Serial #733,406 before referred to, and with forward leaning wheels constructed in accordance with the present application.

I do not wish to be limited to the details of construction or arrangement of parts, as these might be changed in many respects without departing from the spirit of the invention as defined in the appended claims.

I claim:—

1. In a vehicle of the character described, an axle, wheel knuckles pivotally mounted upon the ends of the axle for tilting movement in a vertical plane, wheels mounted thereon, a sleeve operatively supported upon the axle, a shaft passing downward through said sleeve, a superstructure, said shaft passing through the pivotal center of the superstructure and said sleeve, manually operable means for rotating the shaft, a member mounted upon the axle for movement longitudinally thereof and transverse to the draft line of the vehicle and operatively connected to the knuckles to cause their simultaneous oscillation in the same direction, and means operatively connecting said shaft to said member to shift the member upon an oscillation of the shaft.

2. In a vehicle having leaning wheels, an axle, wheel knuckles pivotally mounted upon the ends of the axle for tilting movement in a vertical plane, a connection between the knuckles for simultaneous movement, a transversely disposed shaft, a worm mounted thereon for sliding movement on the shaft and rotatable movement with the shaft, a fixed nut through which the worm passes and whereby upon a rotative movement of the shaft and worm the worm will travel on the shaft, a member operatively connected to the worm and moving therewith and operatively connected to one of said knuckles to tilt it in a vertical plane as the worm is moved longitudinally on the shaft, and manually operable means for operating the worm.

3. In a leaning wheel grader of the character described, a forward axle, wheel knuckles pivotally mounted upon the ends of the axle for tilting movement in a vertical plane, a link connecting the knuckles for simultaneous movement, a transversely disposed shaft operatively mounted upon the axle, a worm mounted on the shaft for sliding movement along the shaft and rotative movement with the shaft, a fixed nut mounted upon the axle with which said worm engages, a member operatively mounted upon the worm and moving therewith and operatively connected to one of said knuckles, and manually operable means for rotating said shaft.

4. In a leaning wheel grader, a forward axle composed of two parallel bars spaced from each other, knuckles pivoted between said bars at the ends thereof and having wheel stubs and upwardly extending arms, a transversely extending link connecting said arms, a shaft disposed above the axle, bearings for the shaft having portions thereof extending between the bars of the axle and spacing the same and connected thereto, a worm sleeve mounted upon the axle for longitudinal sliding movement thereon and rotative movement therewith, a fixed nut mounted upon the axle, a portion thereof extending downward between the bars of the axle and spacing the same and connected thereto, a member having swiveled engagement with the extremity of the worm and moving therewith, a link connecting said member with one of said knuckles, and manually operable means for rotating said shaft.

5. In a leaning wheel grader, a forward axle composed of two parallel bars spaced from each other, knuckles pivoted between said bars at the ends thereof and having wheel stubs and upwardly extending arms, a transversely extending link connecting said arms, a shaft disposed above the axle, bearings for the shaft having portions thereof extending between the bars of the axle and spacing the same and connected thereto, a worm sleeve mounted upon the axle for longitudinal sliding movement thereon and rotative movement therewith, a fixed nut mounted upon the axle, a portion thereof extending downward between the bars of the axle and spacing the same and connected thereto, a member having swiveled engagement with the extremity of the worm and moving therewith, a link connecting said member with one of said knuckles, a beveled gear wheel mounted upon the shaft, a vertical shaft having a beveled gear wheel engaging the first named beveled gear wheel, and means connected to the vertical shaft whereby it may be manually rotated.

6. In a leaning wheel grader, a forward axle, knuckles operatively pivoted upon the extremity of the axle and each having an upwardly extending arm and an outwardly extending wheel stub, a link connecting said upwardly extending arms, arched bars mounted upon the axle and extending vertically upward therefrom, a tubular king pin supported on said arched bars and extending vertically upward therefrom, a sleeve loosely surrounding the king pin and with which the forward end of the grader frame and forward ends of the draft bars are adapted to be connected, a shaft mounted upon the axle and extending parallel thereto, a worm mounted upon the shaft and rotating therewith, a member controlled by said worm and having operative connection with one of said knuckles, means for rotating the shaft including a shaft passing vertically downward through the king pin, coacting beveled gear wheels mounted upon said shafts, the upper end of the vertical shaft having a universal joint, and an operating shaft section connected to said universal joint.

7. In a leaning wheel grader, a forward axle composed of two spaced bars, wheel knuckles pivoted between said bars and having upwardly extending arms, a link connecting said arms, a shaft mounted upon the axle, a worm carried by the shaft, a member controlled by said worm and operatively connected to one of said wheel members, said member having a portion extending downward between said bars and guided thereby and being thus held from rotary movement, a connection between said member and one of said knuckles, and manually operable means for rotating said shaft.

8. In a leaning wheel grader, a forward axle comprising two spaced bars, knuckles pivoted between said bars and having wheel stubs and upwardly extending arms, a connecting link between said arms, a pair of upwardly arched bars connected to the axle, a tubular king pin mounted upon said arched bars and extending vertically upward therefrom, a bushing loosely surrounding said king pin and adapted to be connected to the frame of the grader, to the draft bars and to the tongue thereof, a shaft disposed above the axle and extending parallel thereto, a bearing member for one end of the shaft having a base disposed between and spacing the axle bars, a worm sleeve slidable upon but rotating with the axle, a fixed nut through which the worm sleeve passes and having a base extending between the bars and spacing the same apart, a member swiveled upon the end of the worm and having a portion thereof extending between the bars and guided thereby, said member having oppositely disposed trunnions, a pair of links pivoted upon said trunnions and operatively pivoted at their other ends to one of said arms, and manually operable means for rotating the shaft including a shaft section extending downward through said tubular king pin and at its upper end having means whereby it may be connected to operating devices.

9. In a leaning wheel grader, an axle, wheel knuckles pivotally mounted upon the ends of the axle for tilting movement in a vertical plane, wheels carried thereon, an arch mounted upon the axle, a sleeve carried upon the arch, a superstructure resting upon the upper end of the sleeve, a shaft passing downward through said superstructure and through the sleeve, draft bars operatively connected to the sleeve, the sleeve being oscillatable around the axis of the shaft, manually operable means for oscillating the shaft, and means operated by the shaft for shifting the knuckles simultaneously in either direction.

10. In a leaning wheel grader, an axle, knuckles operatively pivoted upon the extremity of the axle, an arched bar mounted upon the axle and extending vertically upward therefrom, a tubular king pin supported on the arched bar and extending vertically upward therefrom, a sleeve loosely surrounding the king pin and with which the forward end of the grader frame is connected, a shaft passing vertically downward through the king pin, manually operable means for oscillating said shaft, and means operatively connecting the lower end of said shaft to the knuckles and causing simultaneous movement of the knuckles in one direction or the other as the shaft is oscillated.

In testimony whereof I affix my signature.

FRANKLIN E. ARNDT.